United States Patent

Murata et al.

[15] 3,675,540
[45] July 11, 1972

[54] DIAPHRAGM

[72] Inventors: Eiji Murata; Kohuku Ito, both of Tokyo, Japan

[73] Assignee: Honeywell Inc., Minneapolis, Minn.

[22] Filed: July 18, 1969

[21] Appl. No.: 842,943

[30] Foreign Application Priority Data

July 19, 1968 Japan............................43/61899

[52] U.S. Cl..................................................92/98, 92/104
[51] Int. Cl............................................................F01b 19/00
[58] Field of Search.............92/103, 103 M, 47, 100, 101, 92/102, 98, 99, 104; 73/278

[56] References Cited

UNITED STATES PATENTS

| | | | |
|---|---|---|---|
| 1,064,714 | 6/1913 | Deegan | 92/104 X |
| 1,659,038 | 2/1928 | Mallory | 92/34 |
| 2,839,086 | 6/1958 | Engelberger | 92/103 X |
| 2,895,506 | 7/1959 | Langsfeld | 92/103 X |
| 2,961,165 | 11/1960 | Whitenack | 92/103 X |
| 3,049,931 | 8/1962 | Lang et al. | 92/103 |
| 3,223,001 | 12/1965 | Morgan | 92/103 X |
| 3,228,248 | 1/1966 | Li et al. | 92/99 X |
| 3,239,827 | 3/1966 | Werner et al. | 92/103 X |

*Primary Examiner*—Edgar W. Geoghegan
*Assistant Examiner*—Leslie J. Payne
*Attorney*—Arthur H. Swanson and Lockwood D. Burton

[57] ABSTRACT

A diaphragm unit having a diaphragm support plate that is subject to corrosion and a corrosive resistant metal sheet that covers an aperture formed by an inner wall of the diaphragm support plate to protect it from corrosion. The sheet is seam welded to the support plate while the aforementioned inner wall, the space between the inner wall and the outermost wall of the support plate and the edge of the outermost wall are held in a tightly adhered to manner with one another.

1 Claim, 2 Drawing Figures

PATENTED JUL 11 1972
3,675,540
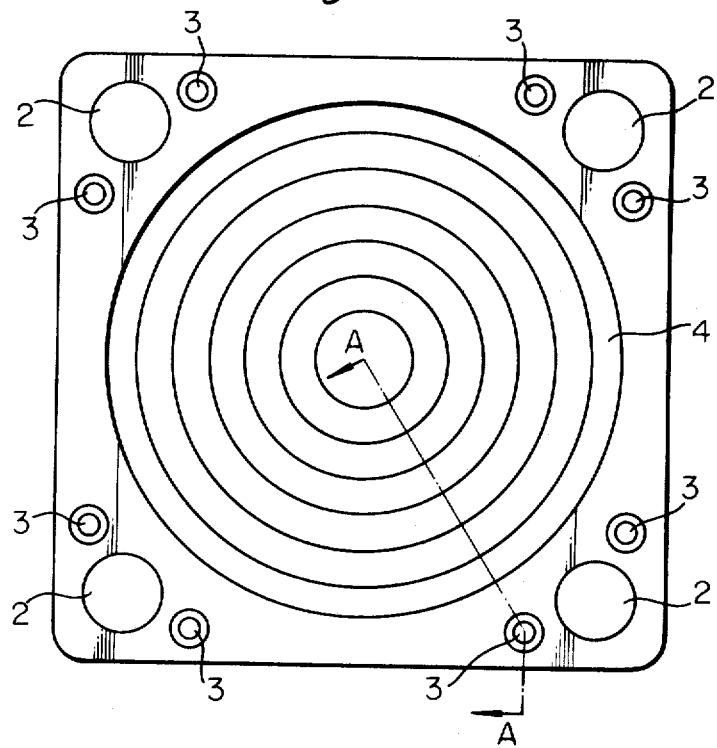
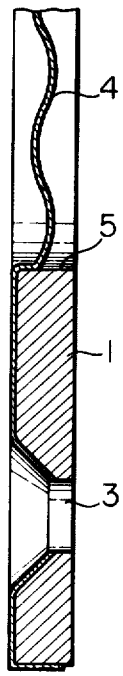
INVENTORS.
EIJI MURATA
KOHUKU ITO
BY
ATTORNEY

DIAPHRAGM

BACKGROUND OF THE INVENTION

This invention relates to a diaphragm adhered to a support plate fixture of a fluid pressure detecting device.

In a fluid pressure detecting device of diaphragm type, such as a manometer and a differential pressure meter, if a diaphragm is kept in contact with fluid to be detected or if a contact type diaphragm is used, not only the diaphragm itself but also fixtures for holding the diaphragm was heretofore required be made of corrosion resisting metal, so as to ensure correct detection of the pressure of both corrosive and non-corrosive fluids. The known devices have difficulties in that the manufacture of corrosion resisting fixtures, which are considerably thicker than the diaphragm, requires a large amount of costly corrosion resisting metal, and the devices become very expensive.

SUMMARY OF THE INVENTION

The present invention relates to a diaphragm in a fluid pressure detecting device which comprises a fixture made of commonly used industrial metallic material, such as relatively inexpensive stainless steel, and a diaphragm made of corrosion resisting metal mounted on the fixture by seamwelding the entire periphery thereof to the fixture in such manner that the diaphragm comes in contact with fluid to be detected. Thereby, the fixture can be made at an extremely low cost without using any costly corrosion resisting metal, yet high corrosion resistivity of the fluid pressure detecting device is ensured.

BRIEF DESCRIPTION OF THE DRAWINGS

FIG. 1 is a front view of an embodiment of the diaphragm provided according to the present invention; and FIG. 2 is an enlarged sectional view, taken along the line A—A of FIG. 1.

DESCRIPTION OF THE PREFERRED EMBODIMENT

The invention will now be described in detail, referring to the accompanying drawings. A fixture 1 is made of commonly used relatively inexpensive metallic material, e.g., stainless steel, and an an apertured wall portion opening 5 is formed at the central portion of the fixture so as to receive a diaphragm 4. A plurality of holes 2 and 3 are bored through fixture 1 at four corners thereof. Diaphragm 4 per se is made of an expensive corrosion resisting metal, such as monel metal and tantalum. Diaphragm 4 is mounted on and is tightly adhered by contraction to those surface and edges of the fixture, which face corrosive fluid, as well as to the edges of opening 5. Then, the entire peripheral edges of diaphragm 4 is bonded to fixture 1 by seamwelding.

As described in the foregoing, according to the present invention, the periphery of diaphragm 4 made of corrosion resisting metal is tightly adhered by contraction to those surface, edges, and inner wall of opening 5 of fixture 1, which face the corrosive fluid, while bonding the entire peripheral edges of the diaphragm to the fixture by seamwelding, whereby no part of fixture 1 comes into direct contact with the corrosive fluid. As a result, the entire fixture is perfectly protected from the corrosive fluid and it is free from corrosion. Furthermore, fixture 1 per se is made of inexpensive commonly used metallic material, instead of costly corrosion resisting metal, so that it can be manufactured at a low cost. In addition, the contraction of the periphery of diaphragm 4 to the edges, the holes, and the openings of fixture 1 results in a highly stable construction of the pressure detecting device. Thus, the present utility model provides a diaphragm type pressure detecting device with numerous important advantages.

What is claimed is:

1. A diaphragm unit comprising a sheet of a corrosive resistive metal, a diaphragm support plate made of a material that is subject to corrosion and having an inner wall that forms an opening therein, said sheet being mounted to cover said wall opening in said plate and being tightly adhered by contraction for engagement with said inner and an outer wall of the plate and an intermediate surface of the plate extending between its said inner and outer edge walls to protect it from the corrosive action of a corrosive fluid, and wherein an inner circumferential portion of the flexible sheet is bonded to the said inner wall of the diaphragm support plate by seam welding.

* * * * *